US006643373B1

(12) United States Patent
Hughes

(10) Patent No.: US 6,643,373 B1
(45) Date of Patent: Nov. 4, 2003

(54) SPEAKER VOLUME INDICATOR FOR TELEPHONE HANDSETS

(76) Inventor: Robert D. Hughes, 275 Chandler Rd., Andover, MA (US) 01810

( * ) Notice: Subject to any disclaimer, the term of this patent is extended or adjusted under 35 U.S.C. 154(b) by 481 days.

(21) Appl. No.: 09/680,825

(22) Filed: Oct. 6, 2000

(51) Int. Cl.7 .......................... H04M 1/00; H04M 11/00
(52) U.S. Cl. ..................... 379/433.04; 379/447; 379/52
(58) Field of Search ....................... 379/433.01, 433.04, 379/447, 52; 455/90.3, 560; 381/56

(56) References Cited

U.S. PATENT DOCUMENTS

| 4,080,517 A | | 3/1978 | Moricca et al. | |
| 4,528,501 A | * | 7/1985 | Dorrough et al. | 381/56 |
| 4,951,311 A | | 8/1990 | Sterr | |
| 5,568,538 A | * | 10/1996 | Tamir et al. | 455/90 |

* cited by examiner

Primary Examiner—Jack Chiang

(74) Attorney, Agent, or Firm—Mark P. White

(57) ABSTRACT

A telephone contains a loudness indicator to assist persons hard of hearing in speaking into the telephone receiver at a moderate level. The indicator contains a microphone, which detects the level of the user's speech. An electronic circuit conditions the microphone output, and outputs one of three signals, depending upon the level of the microphone output. The first signal is output when the speaker speaks at the usual level, driving a first indicator light, which is colored green, to indicate a "go" to the user, that is, increase the level of speech. The second signal is output when the microphone output is slightly above the normal range, and the corresponding indicator light is colored yellow to so indicate. The third signal is output when the microphone output is of a level which far exceeds the normal range of speech. The corresponding indicator light is red, to indicate a "stop" to the user. The device may be built into the handset, and operated by the power available within the handset. Alternatively, the device may be incorporated in an add-on module, which is battery operated, and affixed to the handset by a hook and loop connector. The colored lights are located near the speaker end of the handset, so that the user may see the lights using his peripheral vision, while holding the handset in its normal position.

16 Claims, 6 Drawing Sheets

SPEAKER VOLUME INDICATOR FOR TELEPHONE HANDSETS

BACKGROUND OF THE INVENTION

1. Field of the Invention

This invention relates to the field of telephones, and more particularly to a device for indicating the volume at which the user is speaking.

2. Description Relative to the Prior Art

A number of inventions have attempted provide the hard of hearing with improved means to use the telephone. Approaches include inclusion of volume controls, allowing for increasing the volume for those so requiring, and decreasing the volume for others not so impaired. U.S. Pat. No. 4,951,311 takes such an approach. Other inventions, such as U.S. Pat. No. 4,080,517, provide alternative indicators of signal conditions for persons with other types of disabilities.

Still other inventions include the use of automatic gain control, so that the speaker's voice, as transmitted through the telephone, will automatically be adjusted to the proper level for the average, non-impaired user.

The present invention, in contrast, does not deal with incoming signal levels, nor does it deal with other indicators of telephone status. Rather, it is directed at providing visual feedback to the speaker as to the level of the speaker's voice.

It has been found that persons with impairment of hearing often find it difficult to speak at a volume appropriate for telephone conversation, due to the impairment of the feedback mechanism which allows non-impaired persons to properly modulate their speech volume.

The current invention is simple to use, and easy to install, requiring only the attachment about an existing telephone handset by means of hook and loop fasteners.

SUMMARY OF THE INVENTION

It is an object of the current invention to provide a device to monitor the loudness of speech of hearing-impaired persons, and to display this loudness in a simple, easy-to-use manner, so that they may modulate their speech at a level suitable for telephone conversation.

In accordance with one aspect of the present invention, a device for regulating the loudness level of speech when using a telephone includes means for electronically detecting the loudness level of the user's speech and means for producing a level signal as a result. A loudness display is produced, indicating the amplitude of the level signal to the user, so that the user regulates his loudness of speech in accordance with the loudness display.

In accordance with a second aspect of the invention, the loudness display further includes several indicator lamps, each having a different color. The means for electronic detection of the loudness level includes means for producing a first output when the level signal amplitude is greater than or equal to a first value, means for producing a second output when the signal level amplitude is greater than or equal to a second value, and so on.

In accordance with a third aspect of the invention, the lamps, the means for detecting the loudness level of the user's speech, and the electronic circuits are incorporated into a telephone handset.

In accordance with a fourth aspect of the invention, the lamps, the means for detecting the loudness level of the user's speech, and the electronic circuits are incorporated in a separate packaging unit, which is removeably attached to the telephone handset, and is powered by a battery contained therein.

In accordance with a fifth aspect of the invention, the packaging unit is attached to the handset by hook and loop means. In accordance with a sixth aspect of the invention, device is in the form of a modular package, attachable to a telephone handset, which contains one or more display elements, each having two or more states, a microphone, detecting the loudness level of speech, and having a level signal output. In addition the device includes an electronic circuit, which inputs the level signal output, and produces one or more display driver outputs, so that each of the outputs is connected to a corresponding display element. The device is powered by a battery, so that the level of the user's speech is reflected in the state of the display elements.

BRIEF DESCRIPTION OF THE DRAWINGS

These, and further features of the invention, may be better understood with reference to the accompanying specification and drawings depicting the preferred embodiment, in which.

DESCRIPTION OF THE PREFERRED EMBODIMENTS

The present invention provides visual feedback to allow hard-of-hearing users of a telephone to modulate their speech so that it is neither too loud nor too soft for the listener at the other end of the telephone.

In the preferred embodiments the visual feedback is generally done by means of indicator lights easily visible to the user while grasping the telephone headset. The invention contains a microphone, disposed in proximity to the telephone handset, so that the level of the user's voice is detected at approximately the same location as the handset speaker, so that the level detected is an accurate measure of the input to the handset speaker. Electronic circuitry transforms the output of the microphone into an electrical signal which causes one or more of the indicator lamps to illuminate, according to the level of the sound so detected.

Figure 1:
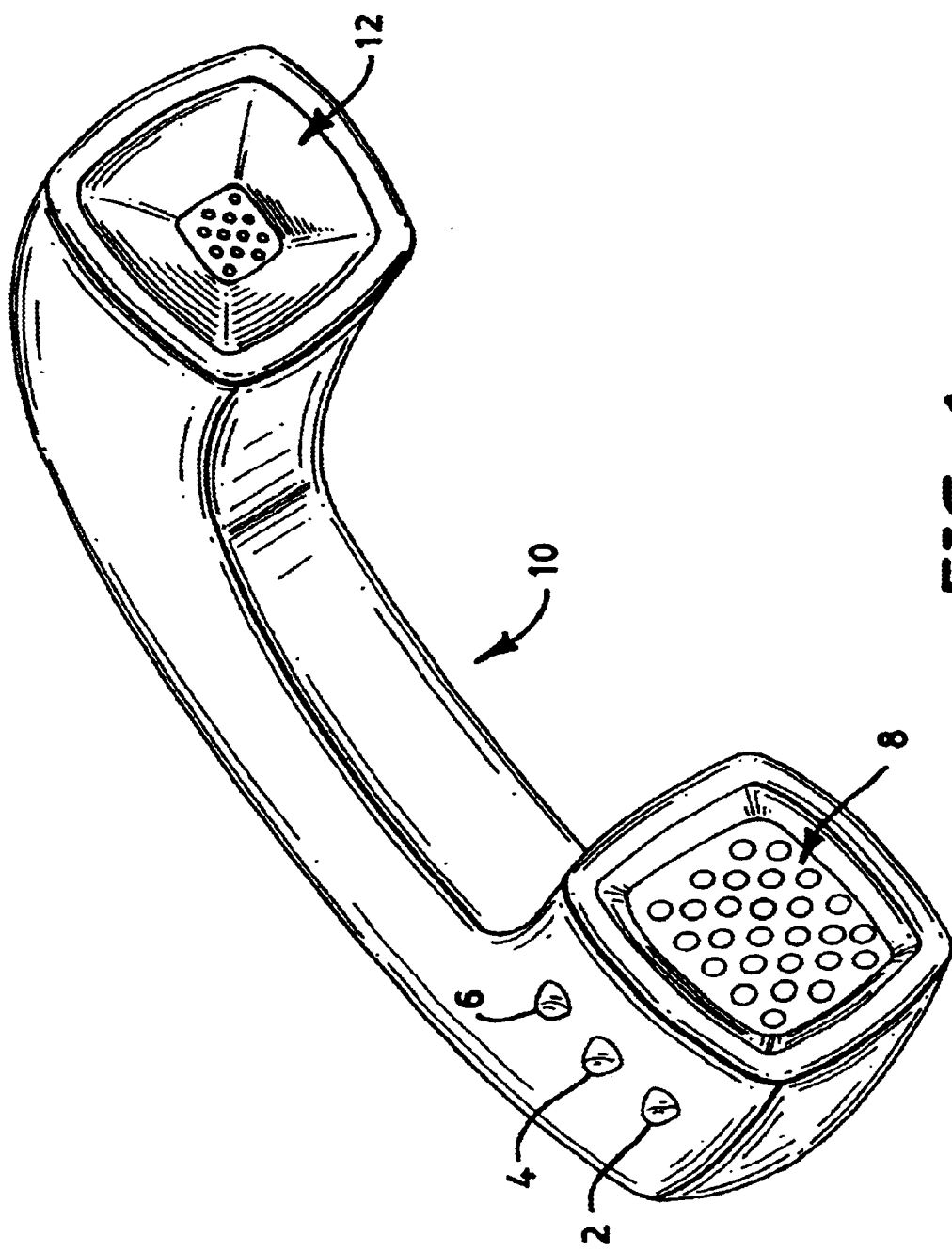
FIG. 1 depicts the first embodiment of the device, incorporated directly into a telephone handset.

The preferred embodiment may be understood by referring first to FIG. 1. The device, as seen in this figure, is implemented by including it within the handset of a normal telephone. In this implementation, the handset contains three lamps 2, 4, 6, disposed along the speaker end of the telephone handset. The handset includes a handgrip portion 10, located between the earpiece 12 and the mouthpiece end 8. Mounted on the side of the speaker end are three indicator lights 2, 4, 6. In the preferred embodiment, these lights are colored red, green and yellow, in the manner of a traffic signal. When the user is speaking at below a normal loudness, none of the indicator lights is illuminated. Green indicates go, that is, it tells the user that he or she is speaking at the proper level. Yellow, or amber, indicates that the speaking volume is becoming too loud. Red indicates stop, that is, it tells the user that he or she is speaking much too loudly.

Figure 3:
FIG. 3 depicts a perspective view of a user talking into a telephone handset equipped with the first embodiment of the invention.

FIG. 3 depicts this device in use. The user is speaking normally into the phone, with the earpiece in proximity to her ear, and with the speaker end in proximity to the speaker's mouth. The three indicator lights 2, 4, and 6, are easily visible to the user either by looking toward them, or by means of the user's peripheral vision.

The combination of illuminated colors is easily seen and understood by the user, who may then modulate his or her voice to produce the loudness desired, according to the combination of indicator lights illuminated.

Figure 2A:
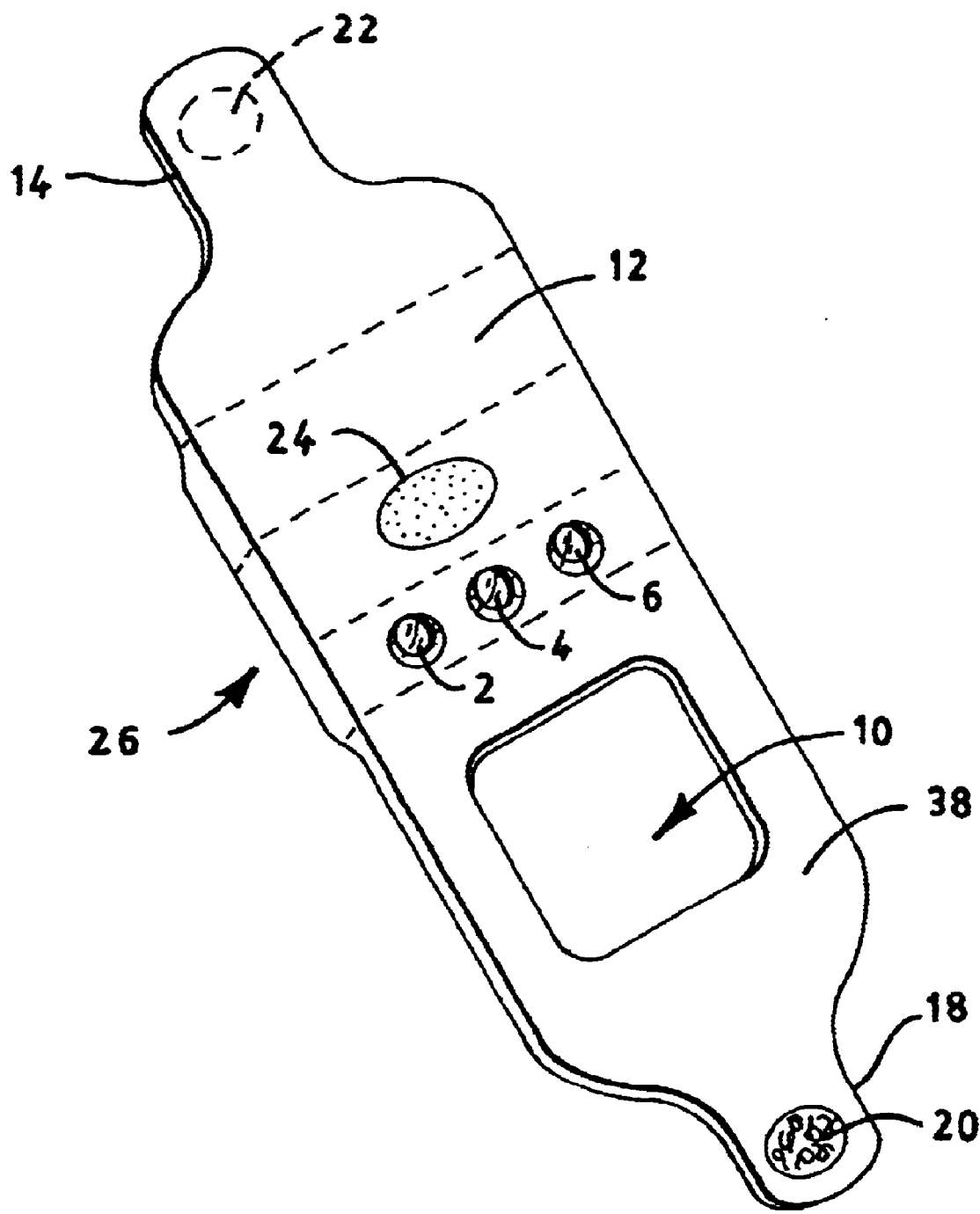
FIG. 2A depicts the second embodiment of the device, shown as a perspective view, which is embodied as a flexible wrap for attachment about the speaker end of a standard telephone handset.
Figure 2B:
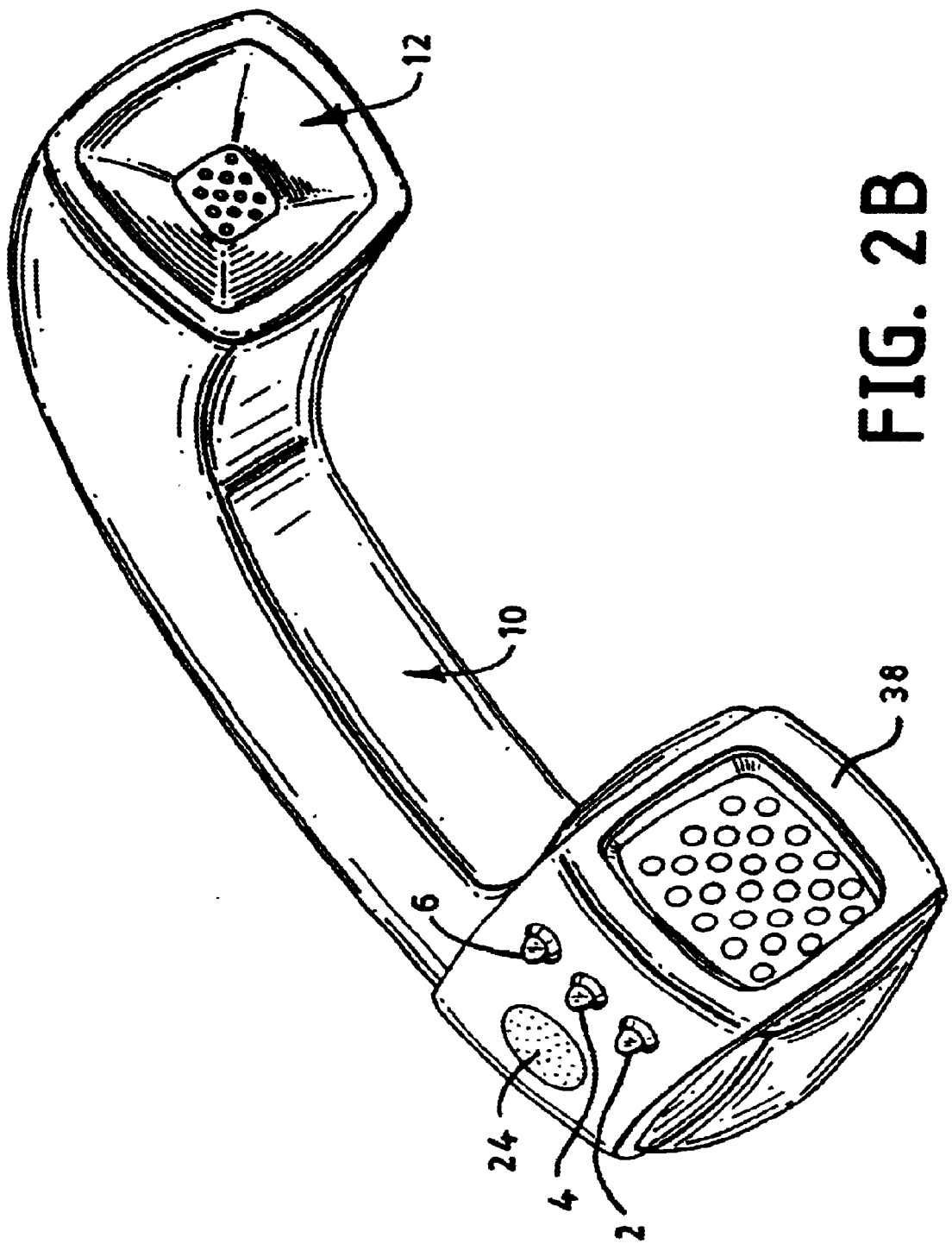
FIG. 2B depicts the device of the second embodiment attached to the telephone handset.
Figure 2C:
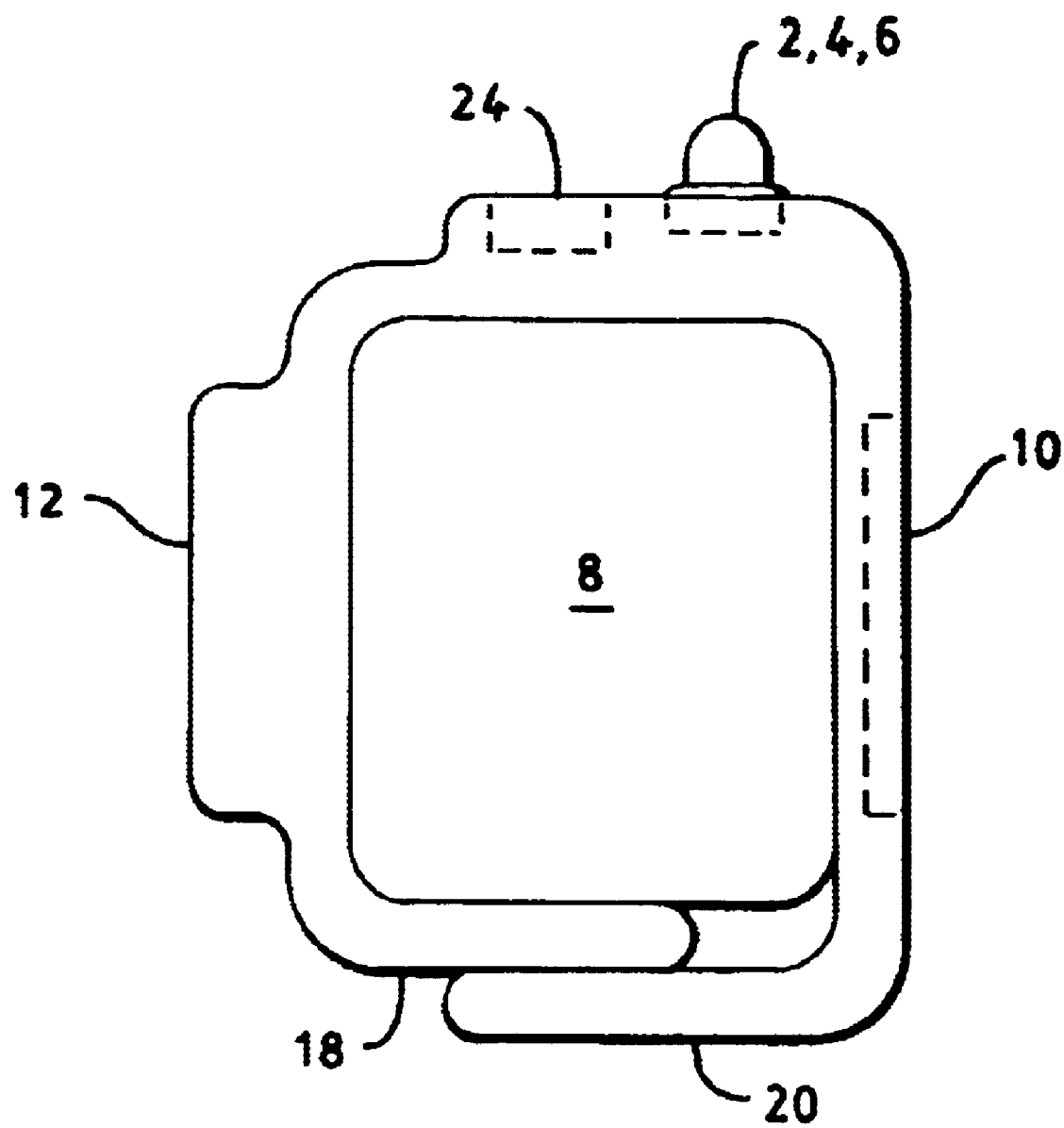
FIG. 2C depicts a cross sectional view of the device of the second embodiment attached to a telephone handset.

Although the first embodiment is implemented by electronics located within the handset itself, a second embodiment is in the form of a portable system, which may be easily and quickly attached to most existing handsets. Referring now to FIGS. 2A, 2B and 2C, the portable device is attached to the telephone speaker end by wrapping around the speaker end.

Referring first to FIG. 2A, the device is shown in perspective view, before attachment to the telephone handset. The device, which is formed of a flexible rubber or synthetic material, in the form of a wrap, which include a first end tab 18 and second end tab 14. Affixed to each tab is a spot of hook and loop fastening material. One such spot 20, containing either the hook or the loop material, is attached to the first end tab 18, while a spot 22 of the mating material is attached to the other end tab 14.

Still referring to FIG. 2A, a microphone 24 is exposed on the upper face of the wrap, and is contained within the sealed electronics compartment 26. Adjacent to the sealed electronics compartment is the battery compartment 12. The indicator lamps, in this embodiment are Light Emitting Diodes (LEDs) 2, 4, and 6.

Below the indicator lamps is the speaker end 38 of the wrap, which contains a speaker opening 100, to allow the user's voice to access the handset speaker.

It should be noted that in alternative embodiments the microphone will be located in closer proximity to the handset speaker, either between the indicator lights and the speaker holes, or on the edge of the speaker end of the wrap, between the hole in the speaker end of the wrap and the long end of the wrap, on the side closest to the user's mouth when speaking as shown in FIG. 3.

Referring now to FIG. 2B, the device is shown attached to the handset. The wrap is attached so that the hole 10 in the speaker end of the wrap exposes the speaker holes in the handset. As shown, the indicator lamps 2, 4, and 6 are disposed on the side of the speaker end of the handset, in proximity to the microphone 24 of the wrap.

Referring now to FIG. 2C, the device is seen in cross section, viewing the speaker end 8 of the phone handset. As shown in FIG. 2C, when the device is in place about the speaker end of the handset, the two tabs 18 and 20 overlap, and attach to each other by means of a hook and loop fastener spots, typically of the Velcro® family.

Still referring to FIG. 2C, the battery compartment 12 is disposed at the side of the handset opposite to the speaker holes. This battery compartment is accessible by means of a door located at the side of the wrap which is in contact with the telephone then the wrap is attached, as shown in the figure. The opening 10 in the speaker end of the wrap is aligned over the speaker holes.

In this second embodiment, the device microphone 24, located in proximity to the indicator lights 2, 4, and 6, will pick up the sound of the speaker's voice when speaking into the phone.

Figure 4:
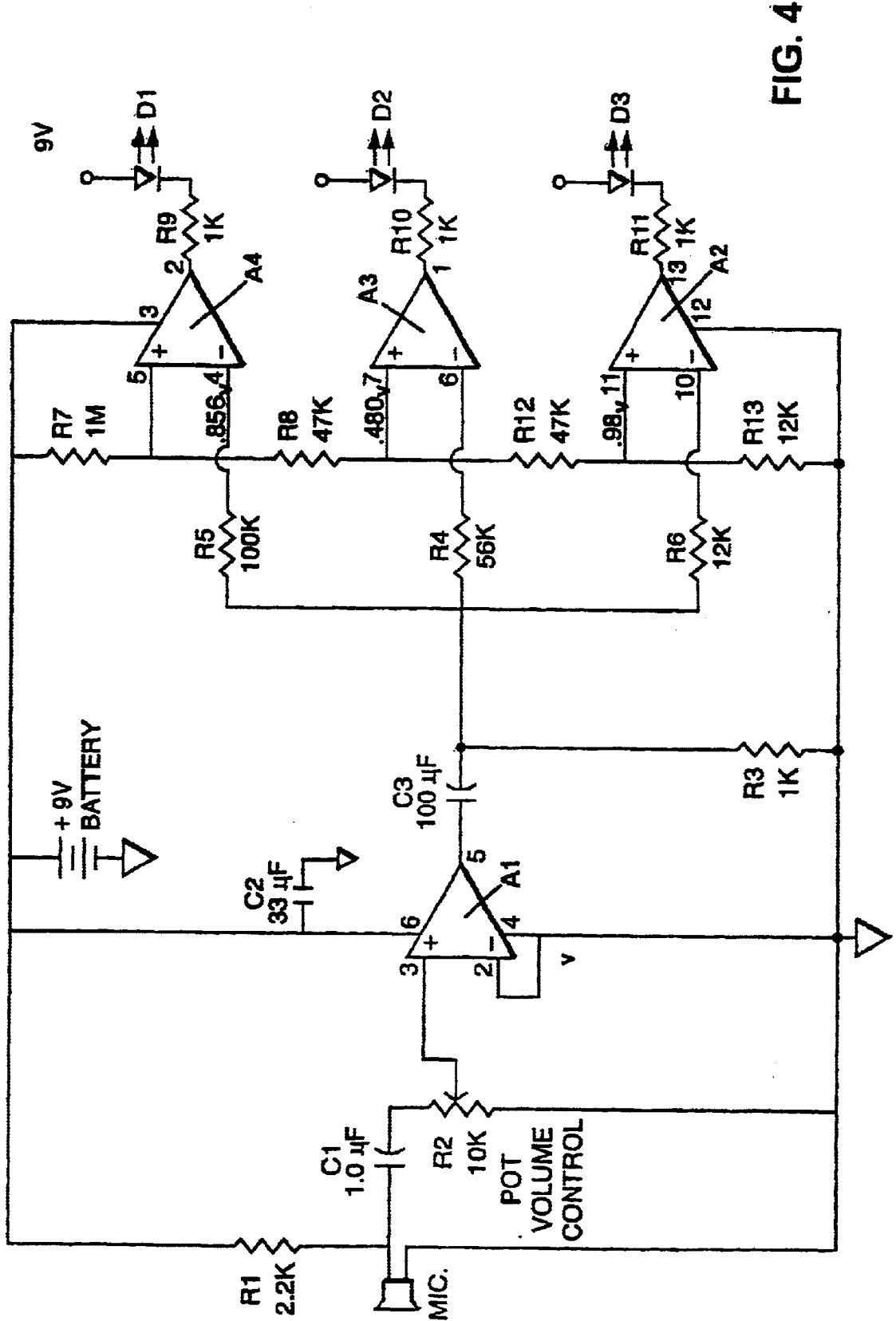
FIG. 4 depicts the circuitry used in the second embodiment of the present invention.

The electronics of the system is depicted in FIG. 4. Referring to this figure, the circuit shown is powered by the microphone element M1 is connected, through an R-C circuit with variable gain via R2, to first amplifier A1. The AC output of A1 is next coupled, through capacitor C3, to the inputs of three differential amplifiers A2, A3, and A4. The outputs of the three differential amplifiers are coupled, in turn, to LEDs D1, D2, and D3.

Each of these amplifiers is biased at a different level. As a result, they present an increasingly larger threshold before the corresponding LED is illuminated.

Still referring to FIG. 4, it is seen that the voltage divider made up of R7, R8, R12, and R13, produce bias voltages of 0.098 V for amplifier A2, 0.480 V for amplifier A3, and 0.856 for amplifier A4. Accordingly, when the voltage at the output of capacitor C3 surpasses 0.098 V, amplifier A2 will produce a positive output, thereby illuminating LED D3. Likewise, when the voltage increases beyond 0.480 V, amplifier A3 will also produce a positive output, illuminating LED D2. And finally, when the voltage increases beyond 0.856 V, the third LED D1 will illuminate as well.

Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention. Details of the embodiments may be varied without departing from the spirit of the invention, and the exclusive use of all modifications which come within the scope of the appended claims is reserved.

I claim:

1. A method for use of a telephone handset by a hard-of-hearing person, the handset comprising a speaker, and the method comprising the steps of:

disposing a means for electronically detecting the loudness level of the person's speech by means affixed to the telephone handset, producing a level signal thereby;

displaying a loudness indication, visible to the person when speaking on the telephone handset, the loudness indication proportional to said loudness level; and regulating by the person her loudness level of speech while speaking into the handset, in accordance with said loudness indication.

2. The method of claim 1, wherein the displaying of a loudness display further comprises providing a multiplicity of indicator lamps, each lamp affixed to said telephone handset, each indicator lamp having a different color, and wherein the electronic detecting of the loudness level further comprises:

producing a first output when the level signal amplitude is greater than or equal to a first value, producing a second output when the amplitude of the level signal is greater than or equal to a second value, and so on, the number of values corresponding to the number of indicator lamps.

3. The method of claim 2, further comprising incorporating the lamps, the means for detecting the loudness level of the user's speech, and the electronic circuit in the telephone handset.

4. The method of claim 2, further comprising incorporating the lamps, the means for detecting the loudness level of the user's speech, and the electronic circuit in a separate packaging unit, which is removeably attached to the telephone handset, and is powered by a battery contained within said separate packaging unit.

5. The method of claim 1, further comprising incorporating a removeable wrap comprising a body, formed of a thin, flexible material, in which a speaker opening is formed, the body further comprising:

(a) a first end tab a second end tab;

(b) means for fastening the body to the telephone hand set attached to each end tab;

(c) a microphone exposed on an upper face of the body, and contained within a sealed electronics compartment within the body; and (d) a battery compartment disposed with the body,
wherein the loudness indication is affixed to the body and the method further comprising the steps of wrapping the body about the telephone handset and fastening it thereto using the fastening means, with the speaker opening exposing the handset speaker.

6. The method of claim 5, wherein the loudness indication further comprises a multiplicity of indicator lamps.

7. A telephone device to assist users in regulating a loudness level of their speech when speaking on the telephone, comprising:

a telephone handset;

one or more display elements incorporated into the handset, each having two or more states;

a microphone incorporated into the handset, which detects the loudness level of speech, and comprises a microphone output signal;

an electronic circuit, which inputs the microphone output signal, and which produces one or more display driver outputs which are connected to the display elements, so that the loudness level of the user's speech is reflected in the state of the display elements.

8. The telephone device of claim 7, wherein:

a) each of the lamps has a different color; and b) the electronic circuit further comprises
   i) one or more signal outputs, each output having an amplitude, and each connected to a corresponding display element;
   ii) electronic means to generate each signal output at an amplitude sufficient to illuminate the corresponding display element.

9. The telephone device of claim 8, wherein the lamps further comprise LEDs.

10. An apparatus in the form of a modular package, attachable to a telephone handset, to assist hard-of-hearing users in regulating a loudness level of their speech, comprising:

one or more display elements, each having two or more states, affixed to the handset in a location whereby the user may observe the display elements while speaking into the handset;

a microphone, detecting the loudness level of speech, and having a level signal output; and an electronic circuit, which inputs the level signal output, and produces one or more display driver outputs, each of which is connected to a corresponding display element;

so that the level of the user's speech is reflected in the state of the display elements.

11. The apparatus of claim 10, wherein:

a) each display element is a lamp;

a) each lamp has a different color; and b) the electronic circuit further comprises
   i) one or more display outputs, each having an amplitude, and each connected to a corresponding lamp; and
   j) electronic means to generate each display output at an amplitude sufficient to illuminate the corresponding lamp.

12. The apparatus of claim 11, wherein the lamps further comprise LEDs.

13. The apparatus of claim 12, further comprising hook and loop attachment means to removeably affix the apparatus to the handset.

14. The method of claim 5, further comprising attaching the packaging unit to the handset by hook and loop means.

15. The method of claim 14, wherein the lamps further comprise LEDs.

16. A removeable wrap, used to assist hard-of-hearing persons in the use of a telephone handset, the wrap comprising a body, formed of a thin, flexible material, in which a speaker opening is formed, and the body further comprising:

(a) a first end tab a second end tab;

(b) means for fastening the body to the telephone hand set attached to each end tab;

(c) electronic circuitry which detects loudness of the person's speech, and which drives a loudness indication, the circuitry contained within the body and disposed within a sealed electronics compartment;

(d) a microphone exposed on an upper face of the body, and contained within the sealed electronics compartment; and (e) a battery compartment disposed with the body;
wherein the loudness indication is affixed to the body, so that user wraps the body about the telephone handset and fastens it thereto using the fastening means, with the speaker opening exposing the handset speaker, allowing the user to regulate the loudness of her speech in accordance with the loudness indication.

* * * * *